(12) United States Patent
Dietsch

(10) Patent No.: US 6,709,372 B2
(45) Date of Patent: Mar. 23, 2004

(54) ROLLER FOR METAL STRIP TRANSFER IN A CONTINUOUS ANNEALING FURNACE

(75) Inventor: Herve Dietsch, Nantes (FR)

(73) Assignee: Usinor, Puteaux (FR)

( * ) Notice: Subject to any disclaimer, the term of this patent is extended or adjusted under 35 U.S.C. 154(b) by 0 days.

(21) Appl. No.: 10/091,036

(22) Filed: Mar. 6, 2002

(65) Prior Publication Data

US 2002/0169060 A1 Nov. 14, 2002

(30) Foreign Application Priority Data

Mar. 6, 2001 (FR) .............................. 01 02988

(51) Int. Cl.⁷ .............................................. F16C 13/00
(52) U.S. Cl. ........................... 492/53; 492/50; 492/54; 29/895.3
(58) Field of Search ........................ 492/59, 58, 54, 492/53, 1, 3, 50; 432/246; 148/530; 29/895.32, 895.3, 895

(56) References Cited

U.S. PATENT DOCUMENTS

| | | | | |
|---|---|---|---|---|
| 2,984,473 A | * | 5/1961 | Ornitz et al. ............... | 428/632 |
| 4,256,519 A | | 3/1981 | Yoshida et al. | |
| 4,470,802 A | * | 9/1984 | Zaizen et al. ................. | 432/2 |
| 4,909,485 A | * | 3/1990 | Yamaguchi et al. ......... | 266/103 |
| 5,070,587 A | * | 12/1991 | Nakahira et al. ............ | 432/246 |
| 5,355,996 A | * | 10/1994 | Hart ............................ | 198/780 |
| 5,441,407 A | * | 8/1995 | Stamm et al. ............... | 432/246 |
| 5,700,423 A | * | 12/1997 | Gao ............................ | 266/103 |
| 5,833,455 A | * | 11/1998 | Carr ............................ | 432/246 |

FOREIGN PATENT DOCUMENTS

| | | |
|---|---|---|
| EP | 0 595 451 | 5/1994 |
| GB | 945-244 | 12/1963 |

OTHER PUBLICATIONS

Patent Abstracts of Japan, vol. 007, No. 135, Jun. 11, 1983.
Patent Abstracts of Japan, vol. 013, No. 179, Apr. 26, 1989.
Patent Abstracts of Japan, vol. 1998, No. 12, Oct. 31, 1998.
Patent Abstracts of Japan, vol. 1997, No. 02, Feb. 28, 1997.

* cited by examiner

Primary Examiner—Charles T. Jordan
Assistant Examiner—T. Nguyen
(74) Attorney, Agent, or Firm—Sughrue Mion, PLLC

(57) ABSTRACT

Roller designated for the transfer of a metal strip within a continuous annealing furnace, consisting of a driving shaft encased in a collar which bears the strip, characterized in that at least the collar is manufactured of a composite material such as carbon-carbon fiber (CCF) or silicon carbide-silicon carbide (SiC—SiC).

7 Claims, 2 Drawing Sheets

ROLLER FOR METAL STRIP TRANSFER IN A CONTINUOUS ANNEALING FURNACE

Figure 1:
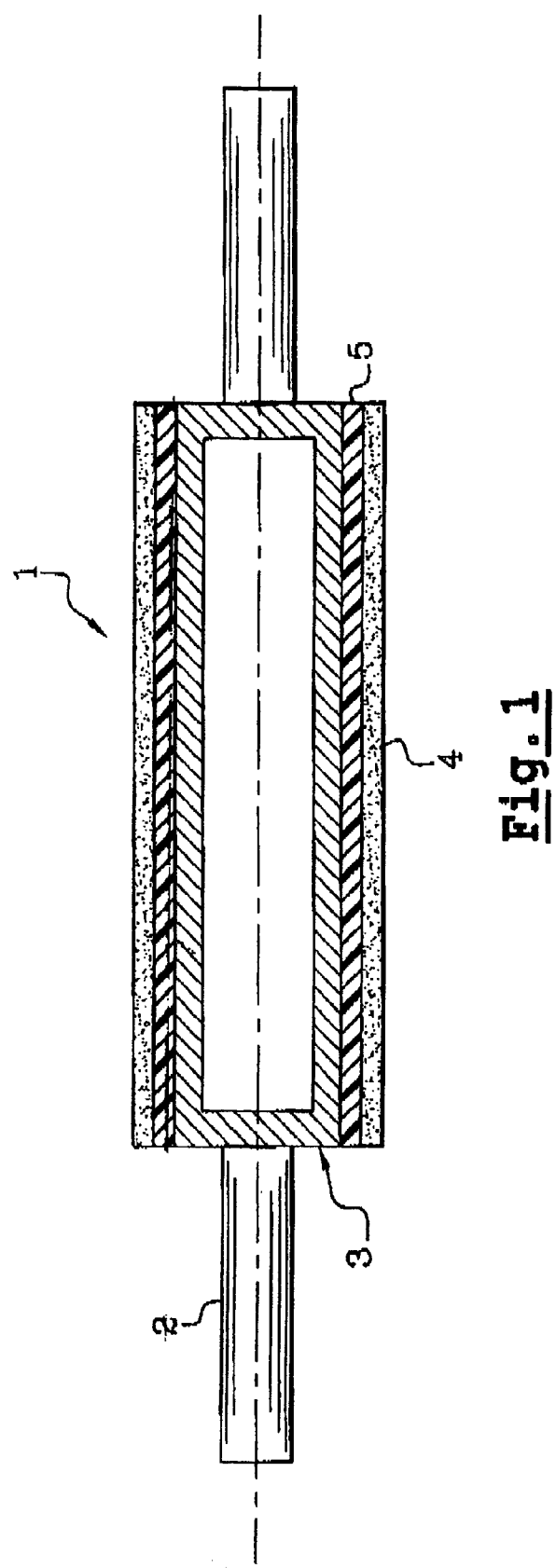

The invention concerns a roller designated for the transfer of a metal strip in a continuous annealing furnace, consisting of a driving shaft encased in a collar that bears the strip.

In general, transfer rollers used in continuous annealing of metal strips made of ferrous and non-ferrous materials are made of alloy steel.

In terms of thermomechanical characteristics, these rollers have a coefficient of thermal expansion of $17.10^{-6}/°$ C. and a coefficient of thermal conductivity of around 20 W/m.° C.

To compensate for the thermomechanical deformations in rollers, a compromise is sought in the mechanical profile of the generatrix of collars on rollers obtained by machining, such as to avoid the development of folds in wide and narrow format strips, as well as strip offsets when processing narrow-format strips. Rollers are generally cylindrical or manufactured with a slightly curved generatrix, however they become deformed in the annealing furnace due to heat intake from the strip being annealed.

Numerous patents propose rollers featuring a shrink ring, e.g. copper-based. The deformation of the generatrix of this-type of roller, in an annealing furnace, is improved by a factor of around 2 due to the high thermal conductivity of copper. However, these rollers are heavy and exhibit high thermal inertia.

GB patent 945,244 also proposes a roller for a continuous metal strip annealing furnace comprising an envelope consisting of either graphite or a mixture of carbon and metal powder sintered with e.g. a bitumen binder. This type of sintered material does not seem to have been developed for industrial purposes.

The goal of the invention is to minimize deformations of the roller profile with changes in temperature and strip format, in order to broaden the application range and allow both wide and narrow strips to pass without developing folds or offsets and without the need for strip guides, due to the presence of a shape-retaining roller exhibiting low weight and inertia and manufactured at a low cost, as compared to rollers made of e.g. refractory steel with a copper shrink ring.

The object of the invention is to propose a roller designated for the transfer of a metal strip in a continuous annealing furnace, consisting of a driving shaft encased in a collar that bears the strip, characterized in that at least the collar is manufactured of a composite material.

The other characteristics of the invention are:
- the shaft is manufactured of a composite material or metal.
- the composite material is chosen between a carbon-carbon fiber (CCF) or a silicon carbide-silicon carbide (SiC—SiC) composite.
- the composite material comprises fibers woven along at least two dimensions.
- the collar comprises a metal or ceramic hard coating.
- the coating is chosen between chromium carbide or zirconia.
- the coating may comprise an underlayer.
- the underlayer material is chosen between IC type carbon or silicon carbide.

The following description and the attached figures are provided for illustration purposes and without limitation in order to facilitate the understanding of the invention.

FIG. 1 presents a sample roller as per the invention.

Figure 2:
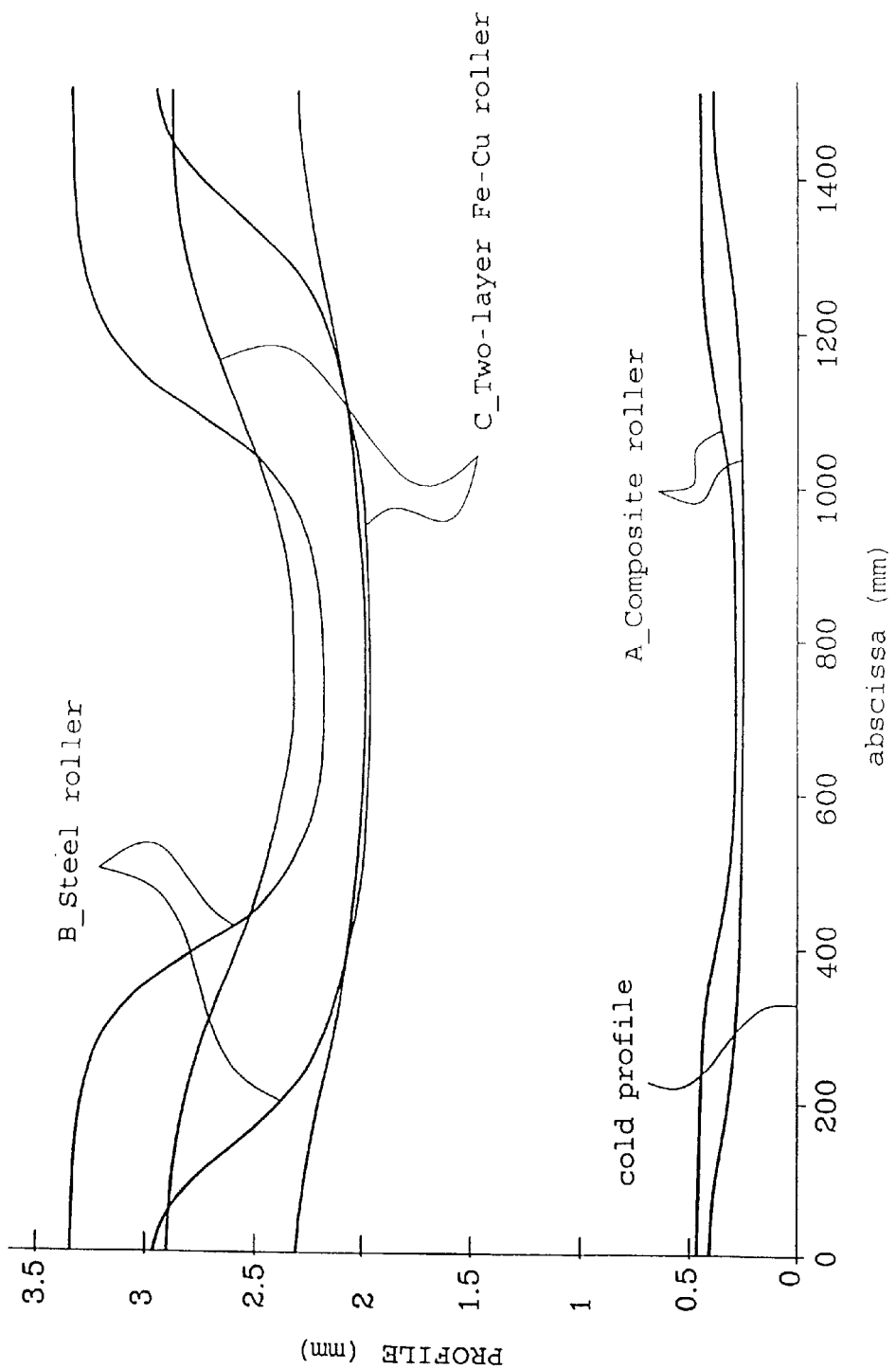

FIG. 2 presents deformation profiles A1 and A2 of roller A as per the invention, for an ambient temperature of 900° C. and two strip widths (strip temperature 300° C.); as well as profiles B1, B2, C1, C2, under the same temperature and strip width conditions, of two rollers B and C, one being a refractory-steel collar, the other having a collar comprising a two-layer iron-copper coating.

As represented in FIG. 1, roller 1 as per the invention is designated for the transfer of a metal strip in a continuous annealing furnace. Said roller 1 is, in a sample application of the invention, composed of a shaft 2 or stub axle designated to support and propel the roller, said shaft being encased in a collar 3 on which the strip being annealed is resting.

According to the invention, at least part of roller 1 is manufactured of a composite material, chiefly the collar 3. For reasons of consistency, shaft 2 of roller 1 may also be manufactured of a composite material.

The composite material employed is chosen between a carbon-carbon fiber (CCF) or a silicon carbide-silicon carbide (SiC—SiC) composite.

In its structure, the composite material comprises fibers that are e.g. woven along two or three dimensions.

Collar 3 will preferably comprise a metal or ceramic hard coating 4. Hard coating 4 therefore comes in contact with the strip being processed. Coating 4 is preferably obtained by the spraying of chromium carbide, zirconia or any other coating material used on furnace rollers.

Roller 1 as per the invention may comprise a collar 3 which exhibits, in the underlayer of coating 4, a layer 5 called a buffer, consisting of a material chosen e.g. between IC type carbon or SiC.

The invention concerns the use of a composite preferably chosen between a carbon-carbon fiber (CCF) or a silicon carbide-silicon carbide (SiC—SiC) composite, for the manufacture of rollers used in annealing furnaces for metal strips, steel strips in particular.

The composite materials chosen are particularly employed at present in the space industry. They are used for their mechanical strength at high temperatures (1200° C.) which is superior to that of refractory steel. Their expansion coefficient is one-fourth to one-eighth that of steel, at one-fourth of the density.

According to the invention, and in the example presented by the diagram in FIG. 2, a carbon-carbon fiber (CCF) composite material is chosen.

The conditions are as follows:
strip temperature: 300° C.
ambient temperature: 900° C.
strip thickness: 0.2 mm.
strip widths: 700 mm to 1200 mm.

It was found that, versus the desired cylindrical shape, diagram A, showing temperature-induced deformations in roller 1 as per the invention, for a length of 1500 mm, exhibits, for this example of two strip widths (700 mm and 1200 mm), a very insignificant variation, preserving a virtually ideal cylindrical shape of the roller. The other comparison rollers B and C develop various concave shapes which depend on strip width, consequently causing deformations in the strip being transferred during annealing. As a result, rollers require machining in order to become compatible with the particular operation of the line.

Nevertheless, a compromise must be sought such that the profile machined to counter the concave shape, e.g. a cylindroconical camber, is suitable for strip widths ranging from 700 mm to 1200 mm.

The roller thus obtained, at one-third of the weight of a steel roller, exhibits one-third of the mechanical inertia;

one-seventh of the thermal camber of steel roller B; and one-half of the thermal camber of roller C, coated with a mixed steel-copper structure.

The proposed solution consists in the replacement of traditional refractory steel with refractory composite materials exhibiting a very low expansion coefficient; in spite of the well-known characteristics of the composite materials proposed by the inventors, the solution is not obvious for the manufacture of high-temperature shape-retaining cylindrical rollers, seeing as the composite materials employed have not been designed for such a purpose or function.

By varying the constituents of the chosen composite—fibers and (or) matrix and the manner in which they are combined—it is possible to optimize factors—mechanical strength, expansion coefficient—such as to adapt the material to the function required in an annealing furnace processing e.g. steel strips.

What is claimed is:

1. A roller designated for the transfer of a metal strip within a continuous annealing furnace, consisting of a driving shaft encased in a collar that bears the strip, wherein said collar is manufactured of a composite material, wherein the composite material is a carbon-carbon fiber or a silicon carbide-silicon carbide composite.

2. The roller according to claim 1, wherein said driving shaft is manufactured of a carbon-carbon fiber or a silicon carbide-silicon carbide composite material or metal.

3. The roller according to claim 1, wherein said composite material comprises fibers woven along at least two dimensions.

4. The roller according to claim 1, wherein said collar comprises a metal or ceramic hard coating.

5. The roller according to claim 4, wherein said coating is chromium carbide or zirconia.

6. The roller according to claim 4, wherein said coating comprises an underlayer.

7. The roller according to claim 6, wherein said underlayer material is IC type carbon or SiC.

* * * * *